July 2, 1968 A. M. MOEN 3,390,701
BALL TYPE MIXING DIVERTER VALVE
Filed June 8, 1965 2 Sheets-Sheet 1
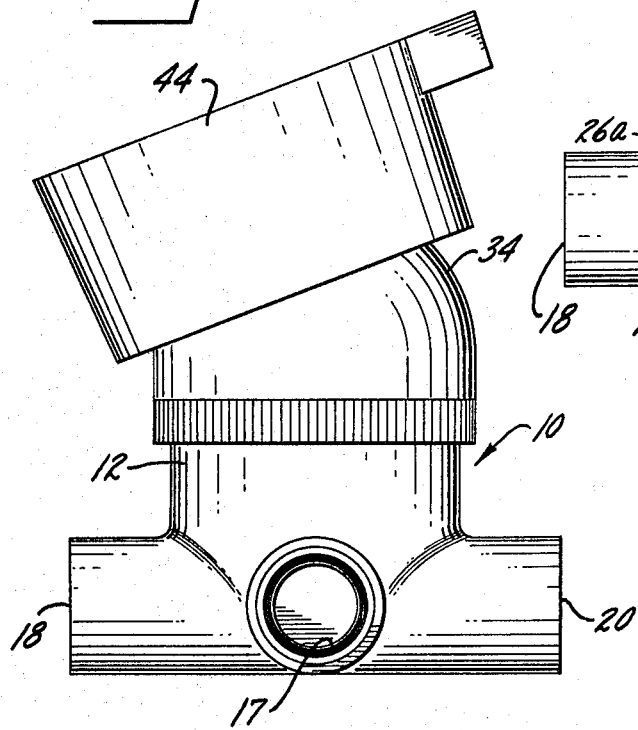
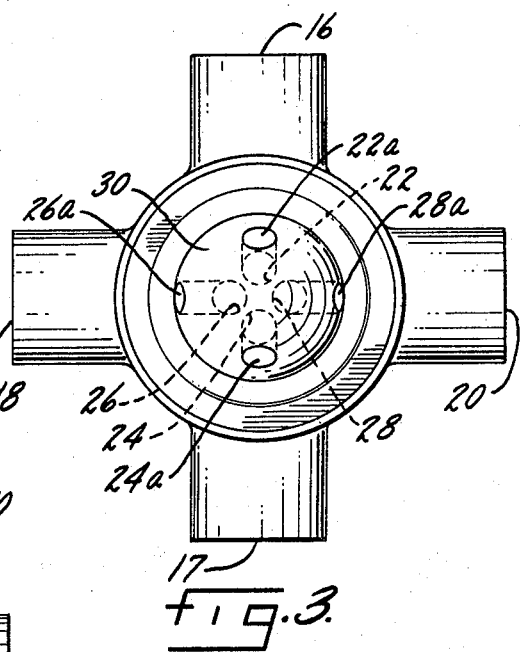
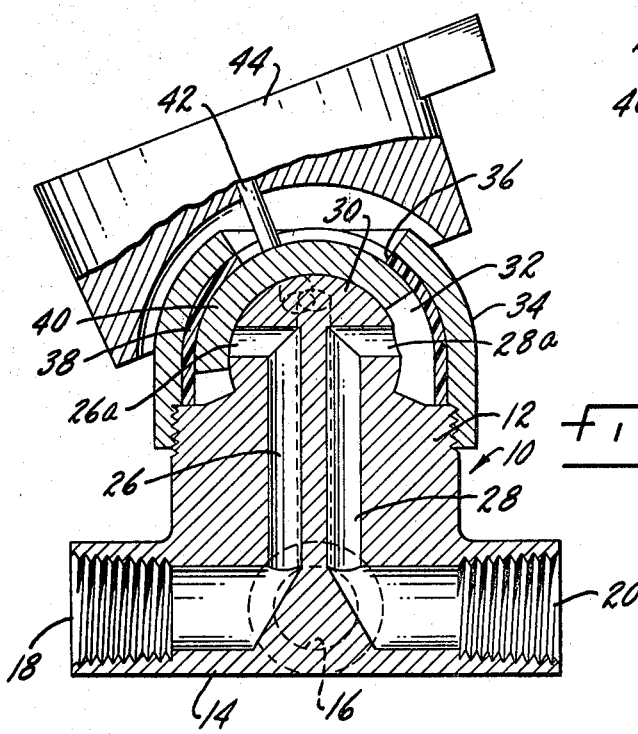
INVENTOR.
Alfred M. Moen,
BY Parker & Carter
Attorneys.

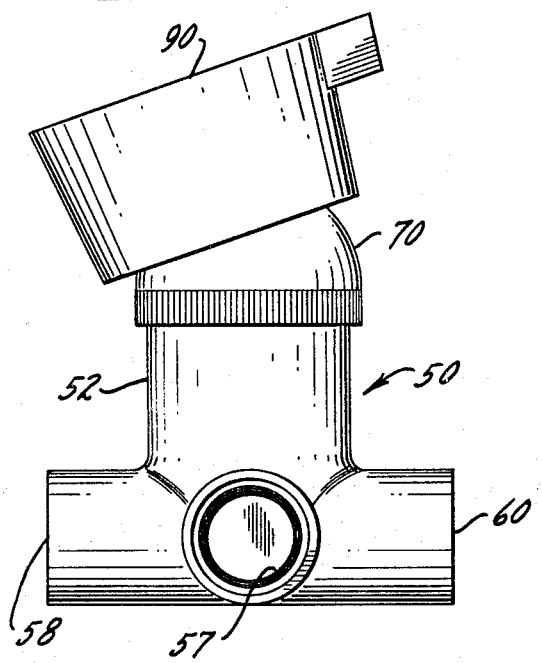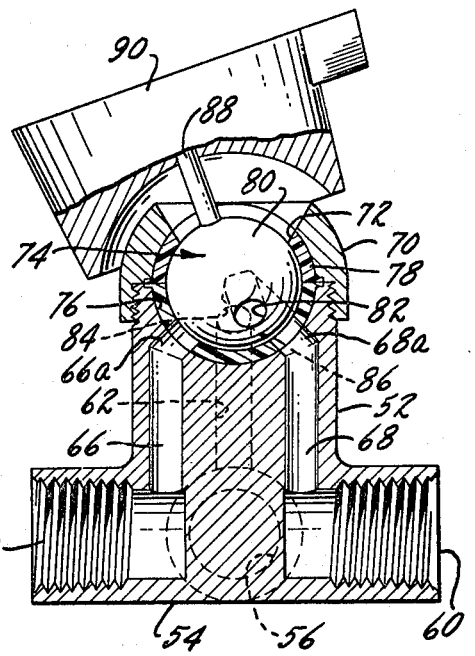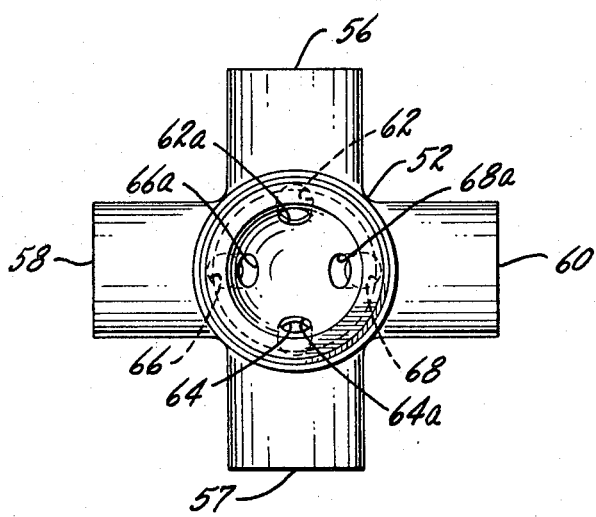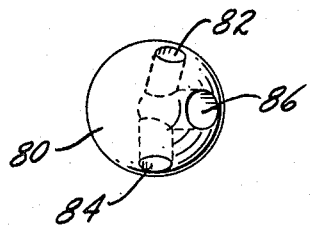

United States Patent Office 3,390,701
Patented July 2, 1968

3,390,701
BALL TYPE MIXING DIVERTER VALVE
Alfred M. Moen, 25 Lakeview Drive,
Grafton, Ohio 44044
Filed June 8, 1965, Ser. No. 462,335
9 Claims. (Cl. 137—625.41)

ABSTRACT OF THE DISCLOSURE

This invention relates to a single lever mixing valve in which the valve member is spherical in shape. The valve member may be rotated about mutually perpendicular axes, with limited rotation about both axes controlling the volume and temperature of the water discharged, with generally complete movement about both axes changing from one discharge opening to the other.

---

This invention relates to a single lever mixing valve and in particular to such a valve in which manipulation of the operating handle can change the direction of water discharge.

A primary purpose of the invention is a mixing valve of the type described which eliminates a diverter, with the valve handle being used to change the direction of water flow.

Another purpose is an improved mixing valve for discharging volume and temperature regulated water.

Another purpose is a compact, relatively inexpensive and reliably operable mixing valve of the type described.

Another purpose is a mixing valve of the type described having a somewhat spherical mixing chamber with a somewhat spherical valve member positioned in the chamber for movement about mutually perpendicular axes.

Other purposes will appear in the ensuing specification, drawing and claims.

The invention is further illustrated diagrammatically in the following drawings wherein:

FIGURE 1 is a side elevation of one form of mixing valve,

FIGURE 2 is an axial section through the valve shown in FIGURE 1,

FIGURE 3 is a top plan view of the housing shown in FIGURES 1 and 2,

FIGURE 4 is a bottom plan view of the valve member illustrated in FIGURES 1-3,

FIGURE 5 is a side elevation of a modified form of mixing valve,

FIGURE 6 is an axial section through the valve shown in FIGURE 5,

FIGURE 7 is a top plan view of the housing shown in FIGURES 5 and 6, and

FIGURE 8 is a bottom plan view of the valve member illustrated in FIGURES 5-7.

Turning now to the form of the invention illustrated in FIGURES 1-4, a housing 10 may have a generally cylindrical section 12 rising upward from a water intake and discharge section 14. The section 14 may include a pair of water inlets, one for hot water and one for cold water, indicated at 16 and 17. The section 14 may also include discharge ports 18 and 20, and when the valve is used in a shower and tub combination, one of the discharge ports may go to the shower and the other to the tub. In like manner, when the valve is used in a kitchen sink, one of the outlets may go to the sink spout, with the other outlet going to a conventional spray or the like.

The cylindrical section 12 may include four generally vertically extending passages. Passages 22 and 24 may connect with the hot and cold water inlets to bring water upwardly, and passages 26 and 28 may connect with the discharge ports 18 and 20 respectively. As shown herein, all of the passages are generally parallel and vertical. However, it should be understood that the invention should not be limited to this configuration. The upper end of the cylindrical section 12 may have a spherical portion 30 which forms the bottom spherical surface of a chamber indicated generally at 32. The upper part of the chamber 32 may be formed by a sealing member 38 positioned inside of a cap or the like 34 which may be screwed onto an exterior threaded surface on the cylindrical section 12. The sealing member 38, again spherical in shape, may be positioned between the inner surface of cap 34 and a generally spherical valve member 40. Member 38 may have an elongated slot 36 for a purpose to be described hereinafter. Although the valve member 40 has been described as spherical in shape, it extends over an area something less than a hemisphere, as illustrated particularly in FIGURE 2, in that there is space in the chamber 32 which is not filled by the valve member 40. A stem or the like 42 may be fixed to the valve member 40 and may extend upward through slot 36 with a manual handle or the like 44 being mounted on the upper end of the stem 42.

The spherical section 30 may have oppositely directed and outwardly extending passage sections 26a and 28a which open into downwardly extending passages 26 and 28 respectively. In like manner, inlet passages 22 and 24 may have oppositely extending and outwardly directed passage sections 22a and 24a which open into the water inlet passages 24 and 22. Valve member 40 may have pairs of passages 46 and 48, one end of which may be in communication with passage sections 22a and 24a through radially extending ducts 24b and 22b. The opposite ends of passages 46 and 48 open at the same area of valve member 40. The surface openings for ducts 24b and 22b are not directly on a diameter. Rather, they are offset, one on each side of a diameter.

In operation, hot and cold water will be directed from the inlet ports upwardly through passages 22 and 24 and outwardly through passage sections 22a and 24a. Assuming the valve is in the position of FIGURES 1 and 2, openings 46 and 48 are in communication with passages 22a and 24a and if the valve is centered, equal amounts of hot and cold water will be directed through openings 46 and 48 into chamber 32. With the valve in the position of FIGURES 1 and 2 only passage section 28a will be in communication with the chamber 32. As a result, the mixed hot and cold water will flow inwardly through passage section 28a and downwardly through passage 28 and then outwardly through port 20. To control the amount and temperature of the water being discharged, handle 44 is rotated to swivel valve member 40 which varies the degree of communication between openings 46 and 48 and passage sections 22a and 24a. The valve member 40 may be swiveled to such an extent that all cold or all hot water may be discharged, or there may be equal amounts of hot and cold water. To control volume handle 44 is rocked in the direction of elongated slot 36, thus generally equally varying the amount of communication between both openings 46 and 48 and passage sections 22a and 22b. The valve can be rocked or moved to a full open or full closed position.

To change the direction of water discharge, for example when the valve is in the position of FIGURES 1 and 2, the water may be discharged into the tub, and to change it for a shower discharge, handle 44 and valve 40 are first rocked such that chamber 32 is in communication with passage section 26a. After the valve is rocked to this position, the valve is then turned through 180 degrees, so that openings 46 and 48 will open into the large space then provided in the chamber. Rocking the valve member and turning it through approximately 180 degrees can, of course, be done simultaneously. When the valve is in this latter position, openings 46 and 48 will discharge into a spaced which is in communication with passage section 26a and hence water will be discharged down through passage 26 and out port 18. In effect, limited rocking and turning movement is used to control volume and temperature to one discharge, with complete rocking and turning movement changing the discharge direction.

Turning now to the form of the invention shown in FIGURES 5–8, a housing 50 may include an upper cylindrical section 52 and a lower intake and discharge section 54. Again, there may be a pair of inlets, one for hot water and one for cold water, with the inlets being indicated at 56 and 57. Discharge ports are indicated at 58 and 60. The inlets are in communication with upwardly directed passages 62 and 64 and in like manner the outlet ports 58 and 60 are in communication with vertically extending passages 66 and 68. A cap or the like 70 may be threaded or otherwise attached to the upper end of cylindrical housing section 52.

A spherical chamber 74 may be defined by the inner spherical surface of cap 70 and an upper spherical surface 76 of the cylindrical housing section 52. A two piece seal member 78 may substantially enclose a spherical ball or valve member 80 which is positioned within chamber 74. An elongated slot 72, similar to slot 36, may be formed in member 78.

The upper ends of vertically extending passages 62, 64, 66 and 68 all have inwardly directed passage sections 62a, 64a, 66a and 68a which open into chamber 74. Ball 80 may have openings 82 and 84 which extend generally from the center of the ball to the outer surface of the ball. It is important to note however that the surface openings for passages 82 and 84 are not directly on the diameter of the ball. Note FIGURE 8. Rather, they are misaligned or offset, with one of the openings, for example 82, being on one side of the diameter and the other opening 84 being on the diameter. There is a third passage or opening 86 in the ball 80 which extends from the junction of openings 82 and 84 outwardly to another surface of the ball. In the position of FIGURES 5 and 6, opening 86 will be in communication with passage section 68a and hence passage 68. The structure shown in FIGURES 5–8 may be completed by a stem 88 fastened to ball 80 and extending outwardly through the slot 72 and a handle 90 on the upper end of stem 88.

In operation, with the valve in the position of FIGURES 5 and 6, water will be directed upwardly through passages 62 and 64 to ball 80. Water will flow inwardly through passages 82 and 84 and then outwardly through passage 86. At this particular position of the valve passage 86 is in communication with passage section 68a and passage 68 and hence water will be discharged out port 60. To regulate the volume and temperature of the water, handle 90 is rotated to vary the degree of communication between passages 82 and 84 and passage sections 62a and 64a. It is important to note that passages 82 and 84 are not in alignment so there is no straight-through connection between the hot and cold water supply. To regulate volume, handle 90 is rocked, in the same manner as disclosed in connection with FIGURES 1–4. The handle can be rocked to a full open position, providing the greatest communication between passages 82 and 84 and passage sections 62a and 64a, to a full closed position and to various intermediate positions. When the handle is rocked, it should not be turned if the user wants to maintain a particular water temperature.

To divert the water or change the direction of water discharge, handle 90 is rocked about an axis perpendicular to the plane of the drawings, or it is rocked through the extent of slot 72. This will place opening 86 at the opposite side of the valve. At the same time as handle 90, and hence valve 80, is rocked, it is swiveled or turned through approximately 180 degrees so that passages 82 and 84 are in alignment with passage sections 62a and 64a.

The use, operation and function of the invention are as follows:

This invention is directed to a single lever type mixing valve which varies the volume and temperature of the water discharge. The invention is particularly directed to means for diverting the water from one discharge to another without an auxiliary diverter member. Manipulation of the handle and hence of the valve controlling the volume and tempertaure of the water is sufficient to change the direction of water discharge. The handle and valve is movable about mutually perpendicular axes. For example, in both forms of the invention rocking of the handle and hence of the generally spherical valve member, will change the discharge opening in the valve member to a position to communicate with the opposite outlet port in the valve housing. Not only must the valve be rocked to change the direction of water discharge, but generally it should be swiveled through 180 degrees or thereabouts.

The invention has application at many places in the home. For example, such a valve member is ideally suited to regulate the discharge between the tub and shower in a bathroom. Also, such a valve member may be used in the kitchen sink, where there is an auxiliary spray device. The valve is universal in that it can be used at any place controlling the mixing of hot and cold water within the home.

The invention should not be limited to a spherical shaped valve member or a spherical shaped chamber for the valve member. A flat plate may also be used to provide the same mixing of hot and cold water and water direction diversion.

Of particular importance in the invention is the fact that both water diversion and water mixing is accomplished by manipulation of the same valve member. This completely eliminates the conventional diverter which is normally positioned within the valve and which must be operated by an auxiliary button or an auxiliary device of some sort. There are no additional operating parts to divert water from one discharge to another.

Limited or partial movement about both axes is used to control the volume and tempertaure to one outlet. Generally complete movement about both axes will permit changing from one discharge opening to the other.

Whereas the preferred form of the invention has been shown and described herein, it should be realized that there are many modifications, substitutions and alterations thereto within the scope of the following claims.

I claim:

1. In a single lever mixing faucet, a housing, a chamber in said housing, hot and cold water inlet passages in said housing terminating in inlet ports opening into said chamber, a pair of outlet passages in said housing terminating in outlet ports opening into said chamber, a valve member in said chamber, said valve member having ports therein adapted to be placed in registration with one or both of said inlet ports, passage means communicating said valve member ports with a terminal surface portion of the valve member within said chamber, said valve member comprising blocking means co-acting with said outlet ports in such a manner that said valve member passage means communicate with only one of said outlet ports at a time in dependence on the position of the valve member, said valve member being movable about two different axes, limited movement about both axes regulating the volume and temperature of water entering said passage, with generally complete movement about both axes changing from one housing outlet port to the other.

2. The structure of claim 1 further characterized in that said valve member is at least in part spherical.

3. The structure of claim 1 further characterized in that said valve member is at least in part spherical, with said chamber having a mating spherical surface.

4. The structure of claim 1 further characterized by and including manual operating means attached to said valve member for use in manipulating said valve member.

5. The structure of claim 1 further characterized in that said valve member is a cap having an inner generally spherical surface.

6. The structure of claim 5 further characterized in that said chamber has a spherical surface mating with the spherical surface on the cap, with said cap being movable about two different axes on said chamber spherical surface.

7. The structure of claim 6 further characterized in that the outer surface of said chamber is formed by an exterior housing member, with the inner surface of said exterior housing member being generally spherical in shape.

8. The structure of claim 7 further characterized in that said exterior housing member has an elongated slot, and handle means for manipulating said valve member extending through said slot.

9. The structure of claim 8 further characterized in that said valve is movable about mutually perpendicular axes, with said slot restricting movement about one of said axes.

References Cited
UNITED STATES PATENTS

| | | | |
|---|---|---|---|
| 3,056,418 | 10/1962 | Adams et al. | 137—625.41 X |
| 3,156,260 | 11/1964 | Harvey et al. | 137—625.41 |
| 3,250,296 | 5/1966 | Pearlman | 137—625.4 |

M. CARY NELSON, *Primary Examiner.*

J. R. DWELLE, *Assistant Examiner.*